United States Patent
Reeves et al.

(10) Patent No.: US 8,473,625 B1
(45) Date of Patent: Jun. 25, 2013

(54) PRESERVATION OF NETWORK ADDRESS TRANSLATION (NAT) STATE ACROSS WIRELESS SESSIONS

(75) Inventors: Raymond Emilio Reeves, Olathe, KS (US); Piyush Jethwa, Overland Park, KS (US); Gary Duane Koller, Overland Park, KS (US); Mark D. Peden, Olathe, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 377 days.

(21) Appl. No.: 12/965,007

(22) Filed: Dec. 10, 2010

(51) Int. Cl.
*G06F 15/16* (2006.01)
(52) U.S. Cl.
USPC .......................................................... 709/228
(58) Field of Classification Search
USPC .......................................................... 709/228
See application file for complete search history.

(56) References Cited

U.S. PATENT DOCUMENTS

| | | | | |
|---|---|---|---|---|
| 2007/0291734 | A1* | 12/2007 | Bhatia et al. | 370/352 |
| 2009/0254667 | A1* | 10/2009 | Li et al. | 709/228 |
| 2010/0175123 | A1* | 7/2010 | Karino et al. | 726/12 |
| 2010/0309906 | A1* | 12/2010 | Ramachandran et al. | 370/352 |

OTHER PUBLICATIONS

Srisuresh, et al., "IP Network Address Translator (NAT) Terminology and Considerations," Aug. 1999, 29 pages, The Internet Society.

* cited by examiner

*Primary Examiner* — Wing F Chan
*Assistant Examiner* — David X Yi (57) ABSTRACT

Systems, methods, and computer media are provided for preserving network address translation (NAT) state for a wireless device across wireless sessions. In response to a state preservation request received during a first wireless session, a device account is created for the wireless device, the account storing NAT state that defines approved content providers from whom inbound data traffic is permitted for the wireless device. Upon determining that the first wireless session has ended and that the wireless device has established a second wireless session, the stored NAT state for the wireless device is activated such that the NAT state of the first wireless session is preserved for the second wireless session. New unsolicited data traffic from approved content providers received during the second wireless session is subsequently permitted and forwarded to the wireless device.

19 Claims, 5 Drawing Sheets

FIG. 1

PRESERVATION OF NETWORK ADDRESS TRANSLATION (NAT) STATE ACROSS WIRELESS SESSIONS

BACKGROUND

Wireless devices such as smart phones, laptops, PDAs, and other devices have become ubiquitous in recent years. As the number of wireless devices has increased, demand for data traffic has increased as well. In an effort to reduce waste of network resources due to unsolicited incoming data traffic, conventional technologies such as network address translation (NAT) have been used to limit incoming traffic to sources with whom a particular wireless device has previously initiated communication.

When NAT is implemented, the NAT state of the current wireless session that defines approved content providers from whom inbound data traffic is permitted for the wireless device is tracked and saved during the current wireless session. When the current wireless session ends, however, the NAT state is not preserved. In a wireless environment where devices frequently establish new sessions and change IP addresses, NAT state must be continually rebuilt during each session. This loss of NAT state impedes users wishing to receive unsolicited data traffic from content providers with whom they have communicated in past sessions. Loss of NAT state is additionally problematic for streaming content providers whose streaming session is interrupted by the establishment of a new mobile session.

SUMMARY

Embodiments of the present invention relate to systems, computer media, and methods for preserving network address translation (NAT) state across wireless sessions. The systems and methods describe storing NAT state for a wireless device in a database according to device identifier. When a new wireless session is established for the wireless device and the wireless device is assigned a new IP address, the stored NAT state for the wireless device is accessed and is used as the current NAT state to preserve the NAT state from a previous wireless session that otherwise would have been lost. Content providers defined in the stored NAT state as approved content providers from whom inbound data traffic is permitted for the wireless device are notified of the new IP address. Unsolicited incoming data traffic from the updated content providers is subsequently recognized as originating from an approved content provider and is forwarded to the wireless device.

In one embodiment, one or more computer-readable media (media) having computer-executable instructions embodied thereon are provided that, when executed, perform a method of preserving network address translation (NAT) state across wireless sessions for a wireless device. A state preservation request to preserve NAT state for a wireless device beyond a first wireless session is received from a wireless device in the first wireless session and having a first assigned IP address. NAT state defines approved content providers from whom inbound data traffic is permitted for the wireless device.

In response to the state preservation request, a device account is created for the wireless device. The device account includes: a device identifier; the first assigned IP address; a first translated IP address used to communicate with content providers, the first translated IP address determined through NAT; and a stored NAT state. Upon determining that the first wireless session has ended and that the wireless device has established a second wireless session, the stored NAT state for the wireless device is activated such that the NAT state of the first wireless session is preserved for the second wireless session.

In another embodiment, a system is provided for preserving NAT state across wireless sessions for a wireless device. A portable NAT state (PoNS) server stores device accounts for wireless devices. Each device account includes: a wireless device identifier; an assigned IP address; a translated IP address used to communicate between the wireless device and content providers, the translated IP address determined through NAT; and a stored NAT state. NAT state defines approved content providers from whom inbound data traffic is permitted for the wireless device. The PoNS server provides notice to one or more content providers of an updated translated IP address when a wireless device establishes a new wireless session. The PoNS server also provides the corresponding stored NAT state when a wireless device establishes a new wireless session, preserving the NAT state of a previous wireless session for the new wireless session.

A data session registrar establishes wireless sessions with wireless devices. For each wireless device, the data session registrar assigns an IP address to the wireless device and communicates the assigned IP address and a device identifier for the wireless device to the PoNS server.

A serving data gateway assigns each wireless device a translated IP address based on an assigned IP address. The serving data gateway receives and transmits data between wireless devices and content providers. The gateway also communicates the translated IP address to the PoNS server and receives a stored NAT state from the PoNS server when new wireless sessions are established.

In still another embodiment, one or more computer-readable media (media) having computer-executable instructions embodied thereon are provided that, when executed, perform a method of preserving network address translation (NAT) state across wireless sessions for a wireless device. A request from a wireless device to communicate with a content provider is forwarded to the content provider. The wireless device is in a first wireless session having a first assigned IP address and a first translated IP address. Inbound data traffic from the content provider is received in response to the request. The inbound data traffic is forwarded to the wireless device upon accessing a current NAT state table and determining that the content provider is an approved content provider from whom inbound data traffic is permitted for the wireless device.

A NAT state update is provided to a portable NAT state (PoNS) server that stores device accounts for wireless devices. Each device account includes: a wireless device identifier; an assigned IP address; a translated IP address used to communicate between the wireless device and content providers, the translated IP address determined through NAT; and a stored NAT state. NAT state defines approved content providers from whom inbound data traffic is permitted for the wireless device.

Notification is received that the wireless device has established a second wireless session having a second assigned IP address. A second translated IP address is created for the wireless device. The NAT state of the first wireless session is preserved by populating the current NAT state table with the stored NAT state for the wireless device from the PoNS server. Second session data traffic from the content provider inbound for the wireless device addressed to the second translated IP address is received prior to forwarding a request for communication from the wireless device to the content provider during the second wireless session. In response to receiving the second session data traffic, the preserved NAT state in the current NAT state table is accessed. It is determined from the preserved NAT state that the content provider is an approved content provider from whom inbound data traffic is permitted for the wireless device. The inbound second session data traffic is then forwarded to the wireless device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Illustrative embodiments of the present invention are described in detail below with reference to the attached drawing figures, wherein.

DETAILED DESCRIPTION

The subject matter of select embodiments of the present invention is described with specificity herein to meet statutory requirements. The description itself is not intended to define that which is regarded as the invention. Rather, the claims define the invention. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| CD-ROM | Compact Disc - Read-Only Memory |
|---|---|
| DVD | Digital Versatile Disc |
| EEPROM | Electrically Erasable Programmable Read-Only Memory |
| NAT | Network Address Translation |
| PDA | Personal Data Assistant |

-continued

| PoNS | Portable NAT State |
|---|---|
| RAM | Random-Access Memory |
| ROM | Read-Only Memory |
| SDG | Serving Data Gateway |

Further, various technical terms are used throughout this description. An illustrative resource that expands upon various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention relate to systems, computer media, and methods for preserving NAT state across wireless sessions. As discussed above, NAT is often used to limit unsolicited inbound data traffic and reduce network waste. An undesirable property of NAT is that when NAT is implemented, the NAT state of the current wireless session that defines approved content providers from whom inbound data traffic is permitted for the wireless device is lost when the current session is terminated. This causes frustration for wireless users and limits content providers' ability to communicate. Despite the existence of NAT for many years, the issue of lost NAT state has not been adequately addressed.

Embodiments of the present invention preserve NAT state across wireless sessions while shifting the updating of IP addresses and re-establishment of contact between a content provider and a wireless device at the start of a new session to the wired portion of a network, freeing up wireless resources. A portable NAT state (PoNS) server is implemented that stores NAT state for a wireless device such that the stored NAT state can later be activated and recalled for a subsequent wireless session. Using the PoNS server, the various network components, content providers, and the wireless device communicate and update to preserve NAT state in a current session for a subsequent session. Wireless devices no longer need to send updated IP address messages to content providers, thus freeing wireless resources.

Figure 1:
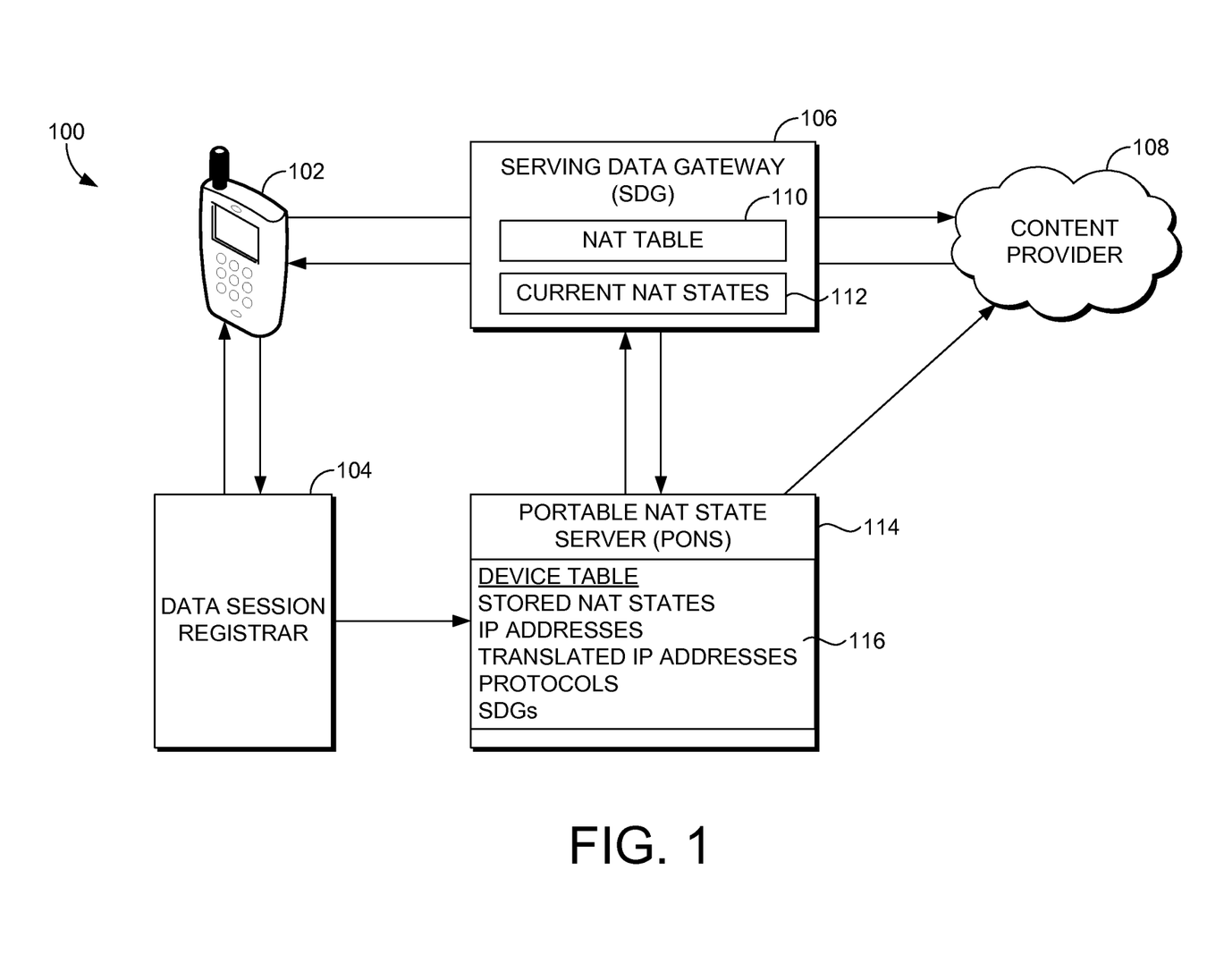
FIG. 1 is a block diagram of a system for preserving NAT state across wireless sessions in accordance with an embodiment of the present invention.

FIG. 1 illustrates a system 100 for preserving NAT state across wireless sessions. Wireless device 102 establishes a session with data session registrar 104. Wireless device 102 may be a PDA, smart phone, laptop, or other wireless device. Data session registrar 104 assigns wireless device 102 an IP address. Serving data gateway (SDG) 106 directs communication between wireless device 102 and content provider 108. SDG 106 may be any server assigned to implement the tasks described herein for SDG 106. SDG 106 implements NAT and translates the assigned IP address of wireless device 102 to a translated IP address. The translated IP address is then used to communicate with content provider 108. SDG 106 includes NAT table 110 and current NAT states table 112. NAT table 110 lists the assigned IP address and translated IP address of each wireless device currently being served by SDG 106. NAT as used in this application refers to network address translation in a general sense as is understood in the art and is not intended to refer to a particular implementation or version of NAT.

Current NAT states table 112 lists, for each wireless device being served, the approved content providers from whom inbound data traffic is permitted for the wireless device. When SDG 106 receives inbound data traffic from a content provider, SDG 106 accesses current NAT states table 112 and determines if the content provider is an approved content provider. If the content provider is approved, the inbound data traffic is forwarded to the appropriate wireless device. If the content provider is not approved, the inbound data traffic is deleted or redirected. A content provider is added to current NAT states table 112 for a wireless device after the wireless device has initiated communication with the content provider. By limiting approved content providers to providers whom a wireless device has previously communicated with, unsolicited inbound data traffic is minimized.

SDG 106 serves data traffic to multiple wireless devices. In some embodiments, a particular network employs a number of SDGs, each SDG serving a different geographic location. Additionally, multiple SDGs may be implemented in one geographic location to provide redundancy. Content provider 108 may be any entity that transmits data traffic to wireless devices.

In addition to assigning an IP address to wireless device 102, data session registrar 104 provides the assigned IP address and device identifier for wireless device 102 to portable NAT state (PoNS) server 114. PoNS server 114 stores device accounts for wireless devices in device table 116. Each device account includes: a wireless device identifier; an assigned IP address; a translated IP address used to communicate between the wireless device and content providers; and a stored NAT state. The stored NAT state defines approved content providers from whom inbound data traffic is permitted for the wireless device. The stored NAT state is established in PoNS server 114 by saving the current NAT state for a wireless device in current NAT states table 112 in SDG 106. The functionality of PoNS server 114 may be distributed among many computing devices and/or implemented in a redundant fashion.

When wireless device 102 establishes a new wireless session and receives a new IP address, PoNS server 114 is implemented to preserve NAT state. Upon determining a new session has been established, PoNS server 114 provides notice to content provider 108 that the IP address for wireless device 102 has changed. PoNS server 114 also provides the stored NAT state for wireless device 102 in table 116 to SDG 106. SDG 106 populates the entry for wireless device 102 in current NAT states table 112 with the stored NAT state. In some embodiments, the connections between PoNS server 114, data session registrar 104, SDG 106, and content provider 108 are wired connections. This allows the process of preserving NAT state and updating IP addresses to be performed in wired network infrastructure rather than occupying valuable wireless infrastructure. In conventional NAT implementations, each time a new session is established, a wireless device would send out update messages to content providers. This wasteful traffic is removed by implementing embodiments of the present invention.

Figure 2:
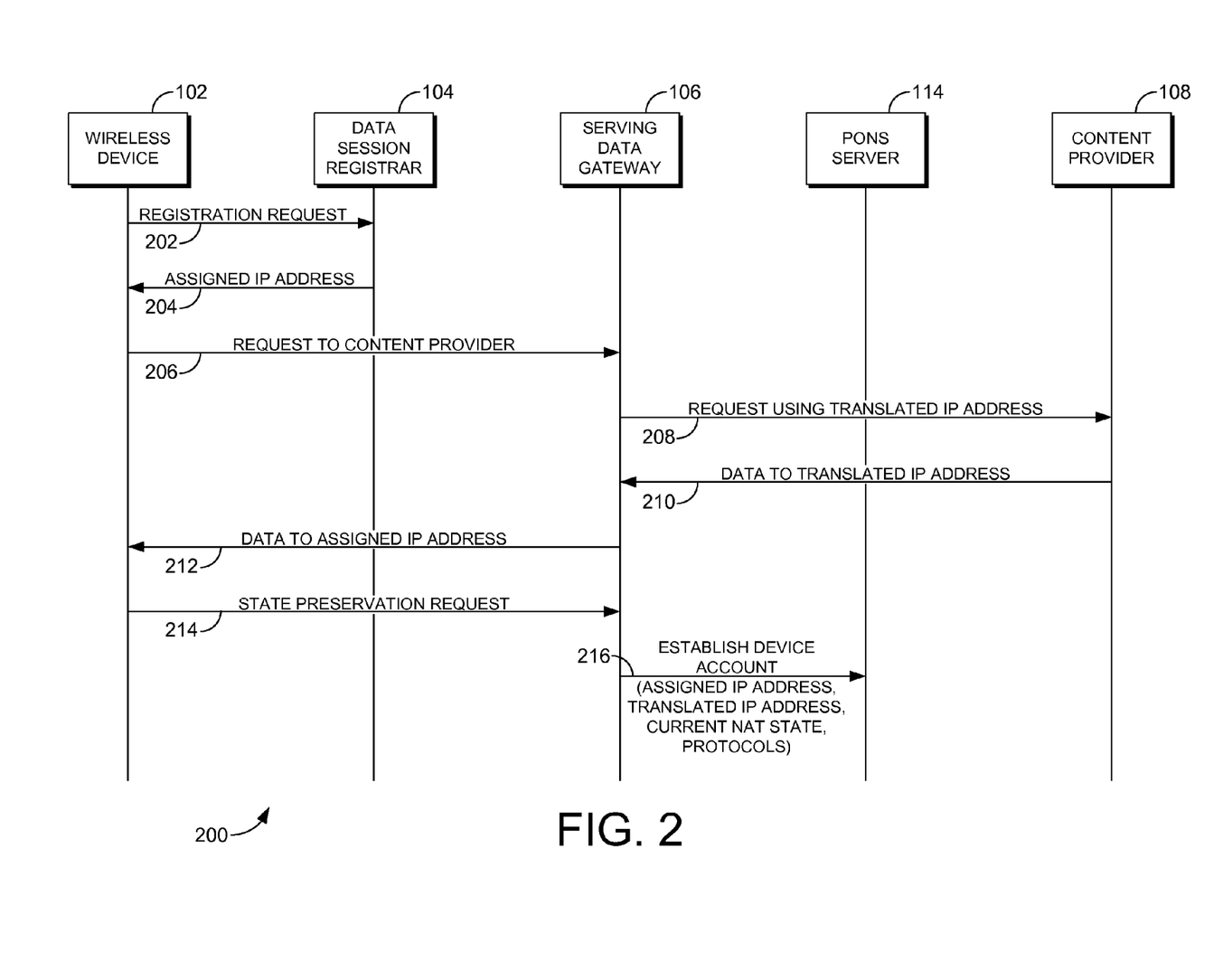
FIG. 2 is a flow chart of an exemplary method for establishing a device account to preserve NAT state across wireless sessions illustrating exemplary system components involved.
Figure 3:
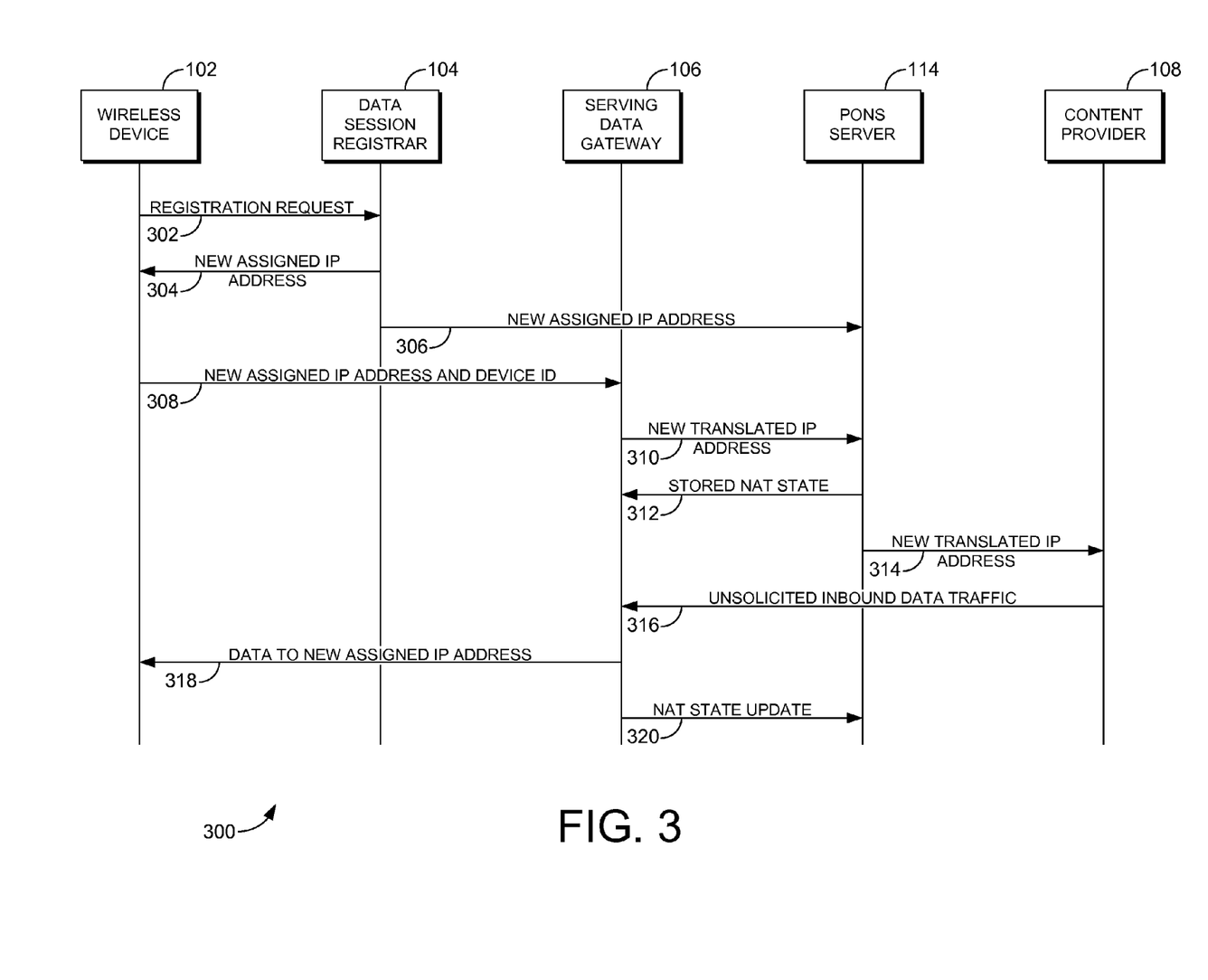
FIG. 3 is a flow chart of an exemplary method for preserving NAT state across wireless sessions illustrating exemplary system components involved.

Exemplary interactions among the components of system 100 in FIG. 1 that preserve NAT state across wireless sessions are illustrated in FIGS. 2-3. FIG. 2 illustrates flow chart 200 illustrating the creation of establishing a device account to preserve NAT state across wireless sessions. In step 202, a registration request is transmitted from wireless device 102 to data session registrar 104. In response, data session registrar 104 assigns wireless device 102 an IP address in step 204. The existence of wireless device 102 and its IP address are then communicated to serving data gateway 106, either before wireless device attempts to communicate with a content provider or upon attempting to communicate. Wireless device 102 sends a request to content provider 108. The request is first sent in step 206 to SDG 106. The request is then forwarded to content provider 108 in step 208 using a translated IP address. Inbound data is then communicated from content provider 108 to wireless device 102. The data is addressed to the translated IP addressed and is first transmitted to SDG 106 in step 210. If content provider 108 is an approved content provider, the inbound data will be forwarded to wireless device 102. In this example, wireless device 102 initiated contact with content provider 108 in the current wireless session, so content provider 108 is defined as an approved provider. The inbound data is forwarded to wireless device 102 in step 212.

At this point, wireless device 102 has established a current NAT state that lists content provider 108 as an approved provider. Using conventional NAT, the current NAT state is lost when the current wireless session is terminated. In step 214, wireless device 102 sends to SDG 106 a state preservation request to preserve NAT state for wireless device 102 beyond the first wireless session. In some embodiments, the state preservation request is transmitted in a separate protocol designed for such requests. In other embodiments, this information is included along with other communications and/or using existing protocols. SDG 106 then communicates the following information for wireless device 102 to PoNS server 114: the wireless device identifier, the assigned IP address, the translated IP address, and the current NAT state. PoNS server 114 establishes a device account for wireless device 102 in step 216 that includes this information.

In some embodiments, the state preservation request is user selected. In other embodiments, the state preservation request is automatic and is unknown to the user. In still further embodiments, a state preservation request is automatically sent from SDG 106 upon establishment of a wireless session for a wireless device not having a device account in PoNS server 114.

When the current wireless session is terminated, SDG 106 loses the current NAT state for wireless device 102. Wireless sessions are terminated and re-established for a number of reasons, including a user traveling between SDGs or between networks. When wireless device 102 subsequently establishes a new session and is assigned a new IP address, SDG 106 can activate the stored NAT state in PoNS server 114. That is, the stored NAT state can be accessed and used to populate current NAT state table 112 in SDG 106. FIG. 3 further illustrates an exemplary method 300 of activation of stored NAT state upon establishment of a subsequent wireless session.

In FIG. 3, a device account for wireless device 102 has previously been established on PoNS server 114. In step 302, a registration request from wireless device 102 is received by data session registrar 104. Data session registrar 104 assigns wireless device 102 a new IP address in step 304. Data session registrar 104 communicates the new assigned IP address to PoNS server 114 in step 306, and PoNS server 114 updates the device account for wireless device 102. SDG 106 implements NAT and creates a new translated IP address for wireless device 102. This may be accomplished upon establishing the session or may be accomplished after first initiating communication with a content provider.

In step 308, wireless device 102 communicates its new assigned IP address and device ID to SDG 106. In some embodiments, this information is communicated to SDG by data session registrar 104 or through other means. SDG 106 creates a new translated IP address and provides the new translated IP address to PoNS server 114 in step 310. PoNS server 114 updates the device account for wireless device 102 accordingly. PoNS server 114 then communicates the stored NAT state for wireless device 102 to SDG 106 in step 312. Prior to step 312, SDG 106 did not have any approved content providers listed for wireless device 102 in current NAT states table 112. SDG 106 populates the entry for wireless device 102 with the received stored NAT state communicated in step 312.

In this example, the stored NAT state for wireless device 102 indicates that content provider 108 is an approved content provider. In step 314, PoNS server 114 provides notice to content provider 108 that the new translated IP address is the IP address for wireless device 102. PoNS server 114 knows the new translated IP address as well as the original translated IP address and informs content provider 108 to step sending to the old address and send to the new address. In some embodiments, content provider 108 is configured to accept notification of a new translated IP address for wireless device 102 from a source other than wireless device 102. Such content providers may be thought of as "PoNS enabled." The content providers expect periodic and/or dynamic PoNS updates that may be provided for each wireless device as a new session is established or grouped and communicated in one update.

In other embodiments, content provider 108 is not PoNS enabled and is expecting IP address updates only from wireless device 102. In such embodiments, PoNS server 114 impersonates wireless device 102 by communicating with content provider 108 using at least one of protocols or tokens used by wireless device 102 to communicate with content provider 108. In some embodiments, protocol or token information is stored in the device account and is initially obtained from SDG 106 in current NAT states table 112.

After step 314, SDG 106 has populated current NAT states table 112 with the stored NAT state. Thus, content provider 108, identified in the stored NAT state for wireless device 102, is now defined as an approved content provider for the new IP address of wireless device 102. Content provider 108 is also now aware of the new IP address of wireless device 102. In this way, NAT state from the previous wireless session has been preserved and is present in the new wireless session.

In step 316, SDG 106 receives unsolicited inbound data traffic from content provider 108 addressed to the new translated IP address of wireless device 102. In conventional NAT implementations, this unsolicited inbound data traffic would be blocked because a request to content provider 108 has not yet been initiated from wireless device 102's IP address. NAT state has been preserved in this example, however, so SDG 106 examines current NAT states table 112, identifies content provider 108 as approved, and forwards the inbound data traffic to the assigned IP address for wireless device 102 in step 318. In some embodiments, SDG 106 sends periodic or dynamic NAT state updates to PoNS server 114 in step 320. Such updates ensure that PoNS server 114 keeps the stored NAT state for a wireless device current.

Figure 4:
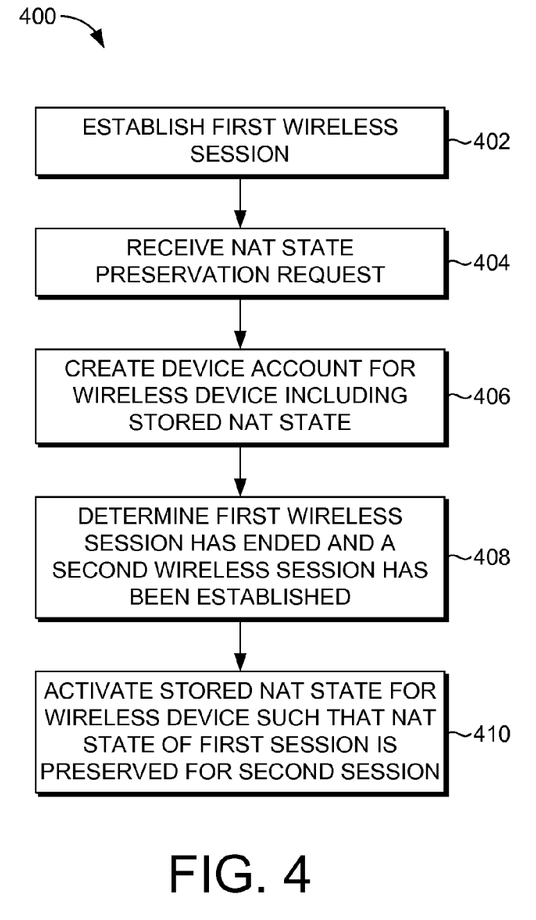
FIG. 4 is a flow chart of an exemplary method for preserving NAT state across wireless sessions.

FIG. 4 shows an exemplary method 400 for preserving NAT state across wireless sessions. In step 402, a first wireless session for a wireless device is established. The wireless device is assigned a first assigned IP address. In step 404, a NAT state preservation request is received. In step 406, in response to the state preservation request, a device account for the wireless device is created. The device account includes: a device identifier; the first assigned IP address; a first translated IP address used to communicate with content providers, the first translated IP address determined through NAT; and a stored NAT state. In step 408, it is determined that the first wireless session has ended and that a second wireless session has been established. In step 410, the stored NAT state for the wireless device is activated such that the NAT state of the first wireless session is preserved for the second wireless session.

Figure 5:
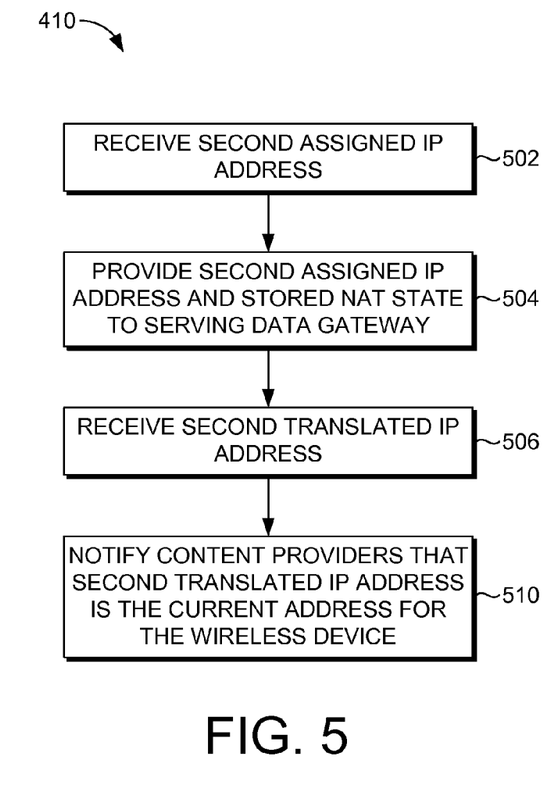
FIG. 5 is a flow chart of an exemplary method of performing step 410 of FIG. 4 to activate stored NAT state for a wireless device.

FIG. 5 illustrates an exemplary way of activating the stored NAT state to preserve NAT state across wireless sessions shown in step 410 in FIG. 4. In step 502, the second assigned IP address for the second wireless session is received. The second assigned IP address and stored NAT state for the wireless device are provided to an SDG in communication with the wireless device in step 504. The stored NAT state is provided by a PoNS server. A second translated IP address for the second wireless session is received, the second translated IP address determined through NAT. One or more approved content providers are notified that the second translated IP address is the current IP address for the wireless device.

Figure 6:
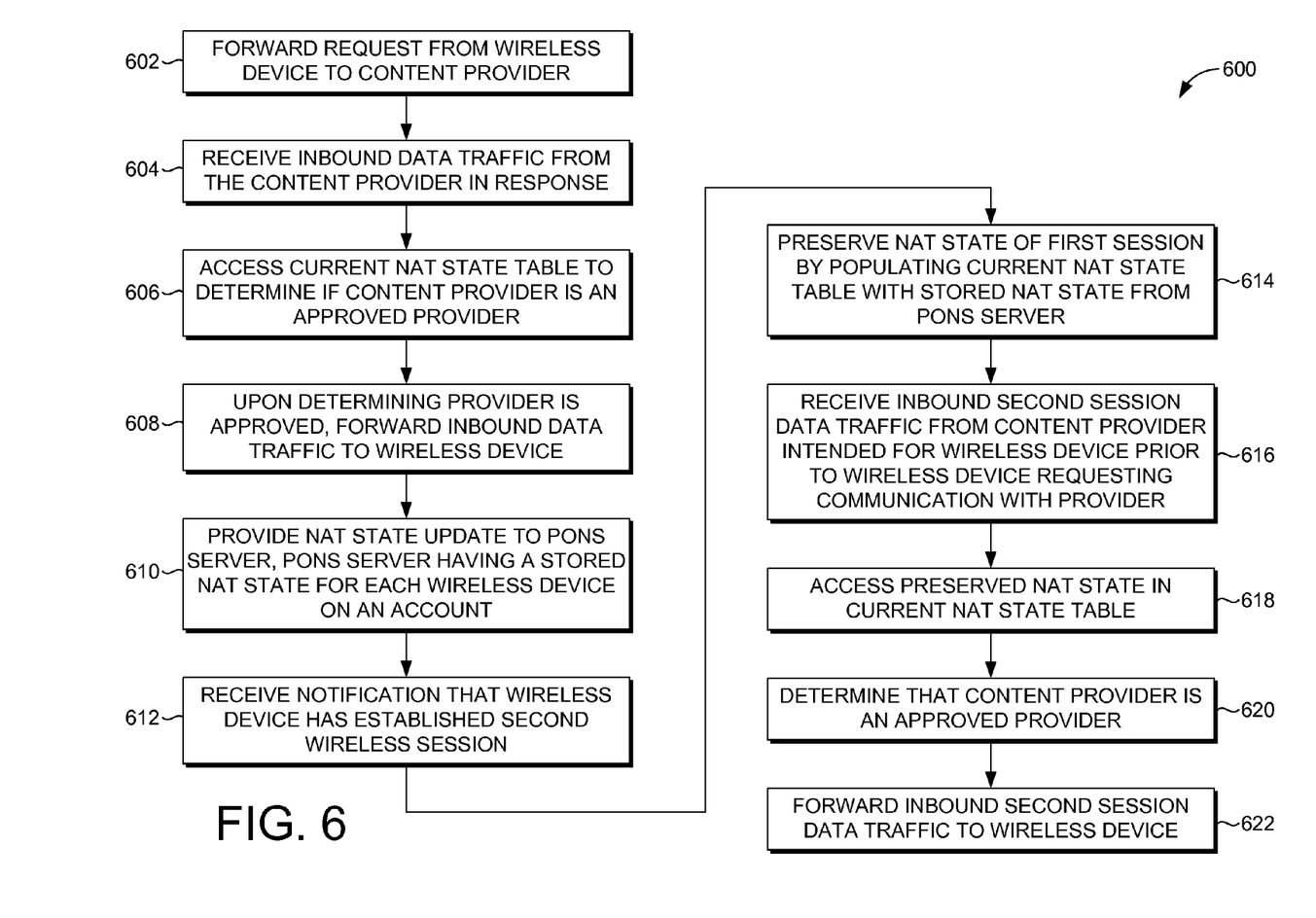
FIG. 6 is a flow chart of an exemplary method for preserving NAT state across wireless sessions in which the preserved NAT state is applied in a new wireless session to allow inbound data traffic from an approved content provider.

FIG. 6 illustrates an exemplary method 600 for preserving NAT state across wireless sessions in which the preserved NAT state is applied in a new wireless session to allow inbound data traffic from an approved content provider. In step 602, a request from a wireless device to communicate with a content provider is forwarded to the content provider. The wireless device is in a first wireless session having a first assigned IP address and a first translated IP address. In step 604, inbound data traffic from the content provider is received in response to the request. In step 606, the current NAT state table is accessed to determine if the content provider is an approved provider from whom inbound data traffic is permitted for the wireless device. Upon determining that the provider is approved, the inbound data traffic is forwarded to the wireless device in step 608. In step 610 a NAT state update is provided to a PoNS server. The PoNS server has a stored NAT state for each wireless device having an account.

In step 612 a notification is received that the wireless device has established a second wireless session having a second assigned IP address. A second translated IP address is created for the wireless device. In step 614, the NAT state of the first wireless session is preserved by populating the current NAT state table with the stored NAT state from the PoNS server for the wireless device. In step 616, inbound second session data traffic addressed to the second translated IP address is received from the content provider. In step 616, a request for communication has not yet been sent by the wireless device to the content provider during the second wireless session. The inbound second session data traffic in step 616 is thus unsolicited traffic.

In step 618, the preserved NAT state in the current NAT state table is accessed. In step 620 it is determined from the preserved NAT state that the content provider is an approved content provider. In step 622, the inbound second session data traffic is forwarded to the wireless device.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media (media) having computer-executable instructions embodied thereon that, when executed, perform a method of preserving network address translation (NAT) state across wireless sessions for a wireless device:
receiving, from a wireless device in a first wireless session having a first assigned IP address, a state preservation request to preserve the NAT state for the wireless device beyond the first wireless session, the NAT state defining approved content providers from whom inbound data traffic is permitted for the wireless device;
in response to the state preservation request, creating a device account for the wireless device, the device account including: a device identifier; the first assigned IP address; a first translated IP address used to communicate with content providers, the first translated IP address determined through NAT; and a stored NAT state;
upon determining that the first wireless session has ended and that the wireless device has established a second wireless session, activating the stored NAT state for the wireless device such that the NAT state of the first wireless session is preserved for the second wireless session, wherein the wireless device has a second assigned IP address;
creating a second translated IP address for the wireless device;
preserving the NAT state of the first wireless session by populating a current NAT state table with the stored NAT state for the wireless device from a portable NAT state (PoNS) server; and
upon receiving, from a content provider, inbound second session data traffic for the wireless device addressed to the second translated IP address prior to forwarding a request for communication from the wireless device to the content provider during the second wireless session:
accessing a preserved NAT state in the current NAT state table,
determining from the preserved NAT state that the content provider is an approved content provider from whom inbound data traffic is permitted for the wireless device, and
forwarding the inbound second session data traffic to the wireless device,
wherein the content provider is configured to accept notification from the PoNS server that the second translated IP address is the current IP address for the wireless device.

2. The non-transitory media of claim 1, further comprising updating the stored NAT state for the wireless device based on a NAT state update received during the second wireless session.

3. The non-transitory media of claim 1, wherein the device account includes, for each approved content provider, a protocol with which the wireless device communicates with the content provider.

4. The non-transitory media of claim 1, wherein the state preservation request is communicated in a separate protocol.

5. The non-transitory media of claim 1, wherein activating the stored NAT state for the wireless device reduces the number of notifications transmitted from the wireless device to content providers when the second wireless session is established.

6. The non-transitory media of claim 1, wherein activating the stored NAT state for the wireless device comprises:
receiving a second assigned IP address for the second wireless session,
providing the second assigned IP address and stored NAT state to a serving data gateway in communication with the wireless device,
receiving a second translated IP address for the second wireless session, the second translated IP address determined through NAT, and
notifying one or more of the approved content providers that the second translated IP address is the current IP address for the wireless device.

7. The non-transitory media of claim 6, wherein the one or more notified content providers are configured to accept notification of a new IP address for the wireless device from a source other than the wireless device.

8. The non-transitory media of claim 6, wherein notifying one or more of the approved content providers that the second translated IP address is the current IP address for the wireless device comprises impersonating the wireless device by communicating with the content providers using at least one of protocols or tokens used by the wireless device to communicate with the content providers.

9. A system for preserving network address translation (NAT) state across wireless sessions for a wireless device, the system comprising:
a portable NAT state (PoNS) server that:
stores device accounts for wireless devices, each device account including: a wireless device identifier; an assigned IP address; a translated IP address used to communicate between the wireless device and content providers, the translated IP address determined through NAT; and a stored NAT state, NAT state defining approved content providers from whom inbound data traffic is permitted for the wireless device,
provides notice to one or more content providers of an updated translated IP address when a wireless device establishes a new wireless session, wherein the wireless device has established a second wireless session having a second assigned IP address, and
provides the corresponding stored NAT state when a wireless device establishes a new wireless session, preserving the NAT state of a previous wireless session for the new wireless session, wherein a current NAT state table is populated with the stored NAT state for the wireless device;
a data session registrar that establishes wireless sessions with wireless devices, and, for each wireless device, assigns an IP address to the wireless device and communicates the assigned IP address and a device identifier for the wireless device to the PoNS server; and
a serving data gateway that:
assigns each wireless device a translated IP address, wherein a second translated IP address is assigned for the wireless device,
communicates the translated IP address to the PoNS server,
receives a stored NAT state from the PoNS server when new wireless sessions are established, and
receives and transmits data between wireless devices and content providers, wherein upon a receipt, from the content provider, of inbound second session data traffic for the wireless device addressed to the second translated IP address prior to forwarding a request for communication from the wireless device to the content provider during the second wireless session: 1) accesses the preserved NAT state in the current NAT state table, 2) determines from the preserved NAT state that the content provider is an approved content provider from whom inbound data traffic is permitted for the wireless device, and 3) forwards the inbound second session data traffic to the wireless device, wherein the content provider is configured to accept notification from the PoNS server that the second translated IP address is the current IP address for the wireless device.

10. The system of claim 9, wherein the serving data gateway transmits NAT state updates to the PoNS server.

11. The system of claim 9, wherein each device account is created by the PoNS server upon receiving a state preservation request from the corresponding wireless device.

12. The system of claim 9, wherein the serving data gateway blocks inbound data traffic from a content provider during a new wireless session when the content provider is not defined as an approved content provider in the stored NAT state received from the PoNS server.

13. The system of claim 9, wherein the PoNS server is in communication with a plurality of serving data gateways, each gateway providing data traffic to wireless devices in a different geographic location.

14. The system of claim 9, wherein device accounts are created by the PoNS server upon receiving a state preservation request from the serving data gateway.

15. The system of claim 9, wherein the stored NAT state in each device account in the PoNS server reduces the number of notifications transmitted from the wireless device to content providers when a new wireless session is established.

16. The system of claim 9, wherein the one or more notified content providers are configured to accept notification of a new IP address for the wireless device from a source other than the wireless device.

17. The system of claim 9, wherein each device account includes, for each approved content provider, the protocol with which the wireless device communicates with the content provider.

18. The system of claim 17, wherein the PoNS server providing notice to one or more content providers of an updated translated IP address when a wireless device establishes a new wireless session comprises impersonating the wireless device by communicating with the content providers using the protocol used by the wireless device to communicate with the content providers.

19. One or more non-transitory computer-readable media (media) having computer-executable instructions embodied thereon that, when executed, perform a method of preserving network address translation (NAT) state across wireless sessions for a wireless device:

forwarding to a content provider a request from a wireless device to communicate with the content provider, wherein the wireless device is in a first wireless session having a first assigned IP address and a first translated IP address;

receiving inbound data traffic from the content provider in response to the request;

forwarding the inbound data traffic to the wireless device upon accessing a current NAT state table and determining that the content provider is an approved content provider from whom inbound data traffic is permitted for the wireless device;

providing a NAT state update to a portable NAT state (PoNS) server that stores device accounts for wireless devices, each device account including: a wireless device identifier; an assigned IP address; a translated IP address used to communicate between the wireless device and content providers, the translated IP address determined through NAT; and a stored NAT state, NAT state defining approved content providers from whom inbound data traffic is permitted for the wireless device;

receiving notification that the wireless device has established a second wireless session having a second assigned IP address;

creating a second translated IP address for the wireless device;

preserving the NAT state of the first wireless session by populating the current NAT state table with the stored NAT state for the wireless device from the PoNS server; and upon receiving, from the content provider, inbound second session data traffic for the wireless device addressed to the second translated IP address prior to forwarding a request for communication from the wireless device to the content provider during the second wireless session:

accessing the preserved NAT state in the current NAT state table, determining from the preserved NAT state that the content provider is an approved content provider from whom inbound data traffic is permitted for the wireless device, and forwarding the inbound second session data traffic to the wireless device, wherein the content provider is configured to accept notification from the PoNS server that the second translated IP address is the current IP address for the wireless device.

* * * * *